(12) United States Patent
Siegfriedsen (10) Patent No.: US 8,230,802 B2
(45) Date of Patent: Jul. 31, 2012

(54) METHOD FOR TRANSPORTING, ERECTING AND REPLACING A NACELLE INCLUDING THE ROTOR OF AN OFFSHORE WIND TURBINE AND WATERCRAFT FOR CARRYING OUT THE METHOD

(75) Inventor: Sonke Siegfriedsen, Drage (DE)

(73) Assignee: Aerodyn Engineering GmbH, Rendsburg (DE)

( * ) Notice: Subject to any disclaimer, the term of this patent is extended or adjusted under 35 U.S.C. 154(b) by 95 days.

(21) Appl. No.: 12/531,820

(22) PCT Filed: Mar. 15, 2008

(86) PCT No.: PCT/DE2008/000455
§ 371 (c)(1),
(2), (4) Date: Mar. 19, 2010

(87) PCT Pub. No.: WO2008/113334
PCT Pub. Date: Sep. 25, 2008

(65) Prior Publication Data
US 2010/0170429 A1 Jul. 8, 2010

(30) Foreign Application Priority Data
Mar. 17, 2007 (DE) .......................... 10 2007 012 848

(51) Int. Cl.
*B63B 27/00* (2006.01)
(52) U.S. Cl. ..................... 114/268; 405/195.1; 405/203; 416/244 R
(58) Field of Classification Search .................. 114/268; 29/889, 889.1; 52/745.18; 405/195.1, 196, 405/203, 224; 414/589; 290/55; 416/223 R, 416/244 R See application file for complete search history.

(56) References Cited

U.S. PATENT DOCUMENTS

| 7,112,010 | B1 * | 9/2006 | Geiger ....................... 405/195.1 |
| 7,234,409 | B2 * | 6/2007 | Hansen .......................... 114/268 |
| 7,528,497 | B2 * | 5/2009 | Bertolotti ........................ 290/55 |

FOREIGN PATENT DOCUMENTS

| FR | 2849877 | 7/2004 |
| WO | 99/43956 | 9/1999 |
| WO | 01/34977 | 5/2001 |
| WO | 01/83290 | 11/2001 |
| WO | 02/48547 | 6/2002 |
| WO | 03/093584 | 11/2003 |
| WO | 03/100178 | 12/2003 |

* cited by examiner

*Primary Examiner* — Lars A Olson
(74) *Attorney, Agent, or Firm* — Diederiks & Whitelaw, PLC (57) ABSTRACT

Method for installing (or replacing) a unit on the tower of an offshore wind turbine, which unit comprises a rotor including a hub and one or two rotor blades, and a nacelle receiving a gearbox and a generator. The method is characterized by pre-assembling the substantially functional unit ashore or on a platform, placing the functional unit on a watercraft in such a manner that the center of gravitation of the unit lies in the region of the longitudinal axis of the watercraft and the rotor blades extend in the longitudinal direction of the watercraft, transporting the functional unit to the site of the offshore wind turbine, lifting the functional unit from the watercraft using a crane aboard the watercraft, placing the functional unit on the tower of the offshore wind turbine, and fastening the functional unit on the tower of the offshore wind turbine.

15 Claims, 8 Drawing Sheets

METHOD FOR TRANSPORTING, ERECTING AND REPLACING A NACELLE INCLUDING THE ROTOR OF AN OFFSHORE WIND TURBINE AND WATERCRAFT FOR CARRYING OUT THE METHOD

CROSS-REFERENCE TO RELATED APPLICATIONS

This application represents a National Stage application of PCT/DE2008/000455 entitled "Method for Transporting, Erecting and Replacing a Nacelle Including the Rotor of an Offshore Wind Turbine and Watercraft for Carrying Out Said Method" filed Mar. 15, 2008, pending.

BACKGROUND OF THE INVENTION

The invention relates to a method for transporting and erecting or replacing a unit, formed by the nacelle and the rotor, of an offshore wind turbine. The invention further relates to a watercraft for carrying out this method.

Wind power has already been known since antiquity to be used for driving machines, and nowadays it is of increasing relevance in particular for producing electrical power. The wind turbines that have evolved from the technology developed for windmills can be used at practically all sites for producing power, wind farms being installed to an increasing extent on the open sea and off the coast—that is to say offshore.

Offshore wind turbines find greater acceptance in the communities. They give fast-growing cities that are situated next to the sea the possibility that is environmentally and resource friendly, to safely guarantee the power requirement of the communities and industries.

Because of the corrosive behavior of sea water, particularly high demands are being placed on the materials used for wind turbines. Designs have to be used that can both withstand brief high energy gusts of wind and high waves.

Erection, maintenance and repair of an offshore wind turbine furthermore places high demands on the construction of the turbine and the transport and installation vessels required for this purpose. In adverse weather conditions, this work on the high seas can possibly be carried out not at all or only to a limited extent. It is therefore necessary especially for requisite larger repair work to be carried out very fast.

To this end it has already been suggested that wind turbines developed for offshore use are first assembled close to the coast to form functional or essentially functional wind turbines and then transfer them to that location where the wind turbine is to be used permanently. WO 01/34977 A1 for example describes such a method and installation resp. transport system for transporting a completely assembled wind turbine into an offshore area resp. out from there again into an area close to the shore for maintenance purposes.

However, the disadvantage of the transport method described in WO 01/34977 A1 is that the wind turbine depicted there already is of very large dimensions because of the assembly that has already taken place, in part it is very tall and also possesses a large lateral extent due to the rotor blade diameter. This entails problems in particular if there are obstacles during the course of the passage en route between that location where the wind turbine is assembled and the offshore area where the wind turbine is to be erected, such as bridges, locks etc. that make transport impossible due to the height and width dimensions of the wind turbine that is assembled and forms a functional unit. This further requires particularly large and thus expensive transport ships.

Most of today's wind turbines are designed such that individual components of the turbine can be replaced. This is a good solution for parts that are small and light-weight. However, if large and heavy components are involved, e. g. gearbox or generator, in-situ replacement or repair is extremely difficult to carry out. A floating crane or a jackup ship with the individual parts and a crew has to brought to the turbine. The components have to be removed under difficult conditions using non-optimal tools and lowered onto the transport ship. The new components have to be lifted into the nacelle and installed again. To all intents and purposes, the new components have a weight of 30 to 60 t, and installation requires a high degree of precision. This sort of repair procedure entails high costs for the transport vessel and the crew, power being lost at the same time due to the turbine standing still. Costs of some 40 to 60000 Euros can arise for each day of repair. Larger repairs may well take several days or even a week. There is then also the danger of the weather changing which may lead to the repair work having to be aborted and thus to the costs increasing even further.

This procedure can only be carried out very fast and thus cost-effectively if the rotor is already attached to the nacelle and can be lifted in one lifting operation on to the tower of the turbine. A three-blade rotor, that is conventionally used today, is not suited for such a procedure for reasons of geometry. Here the turbine has to be installed in two lifting operations for the nacelle and for the rotor. The installation is particularly difficult due to the fact that the three-blade rotor has to be stored on the transport ship in a horizontal position and then has to be rotated through 90° during the course of the lifting operation. This is a difficult operation that can also endanger the crew at higher wind speeds and can lead to the blades being damaged. Connecting the rotor with the nacelle likewise is a critical operation, in particular for offshore wind turbines. Here the hub bolts have to be inserted into the shaft flange and bolted on. This can easily lead the bolts or the bearing surfaces being damaged because at higher wind speeds the rotor cannot be guided precisely to its destination in the case of offshore installation processes.

The efforts, the costs, and the risks have to be regarded as very high for the offshore assembly of a three-blade rotor.

SUMMARY OF THE INVENTION

The object of the invention is therefore a method for transporting and erecting a wind turbine on a foundation in an offshore area, that achieve fast restarting of the turbine in the case of repairs, so as to avoid prolonged down times and power losses.

The invention therefore advantageously suggests in the case of larger defects and prolonged down times connected therewith, to replace the nacelle together with the rotor. To this end, a functional unit is transported by the watercraft to the offshore area, the faulty unit is removed, is placed on the watercraft, and then the functional unit is placed on the tower and fastened thereto.

The inventive procedure has the advantage that when using single-blade and two-blade rotors the functional unit on the watercraft due to the narrow construction can be reached the location of the offshore wind turbine without any obstructions. For example bridges and locks can be passed without any problems. Furthermore the down times of faulty offshore wind turbines and the costs associated therewith are reduced considerably since the offshore wind turbine is immediately fully operational again after the faulty unit has been replaced. Likewise the operating times for the watercraft are reduced considerably. The repair of the faulty nacelles can then be carried out in the port in the assembling hall under good working conditions with all suitable aids and tools. In the process the nacelle and the blades are completely reworked and inspected so that a turbine that is as good as new is available for the next replacement. Large components can very well fail twice during the 20 year lifetime of an offshore wind turbine.

For a wind farm with 100 turbines this means that a turbine has to be replaced about once a month. The cost savings when using the method described are therefore substantial and reach several million Euros per year.

If a faulty offshore wind turbine is to be repaired, the nacelle plus rotor are replaced in the case of a larger damage and longer down times associated therewith. To this end, a functional unit is transported by the watercraft to the offshore area, the defective unit is removed, set down on the watercraft, and after this the functional unit is placed on the tower and fastened thereto.

The inventive solution can however also be used for newly installing and erecting an offshore wind turbine, the foundation component and the tower being first of all erected at the site.

BRIEF DESCRIPTION OF THE DRAWINGS

For carrying out the inventive method, a watercraft is provided that is illustrated in the form of a particularly preferred exemplary embodiment in the enclosed drawings, in which.

DETAILED DESCRIPTION OF THE INVENTION

Figure 1:
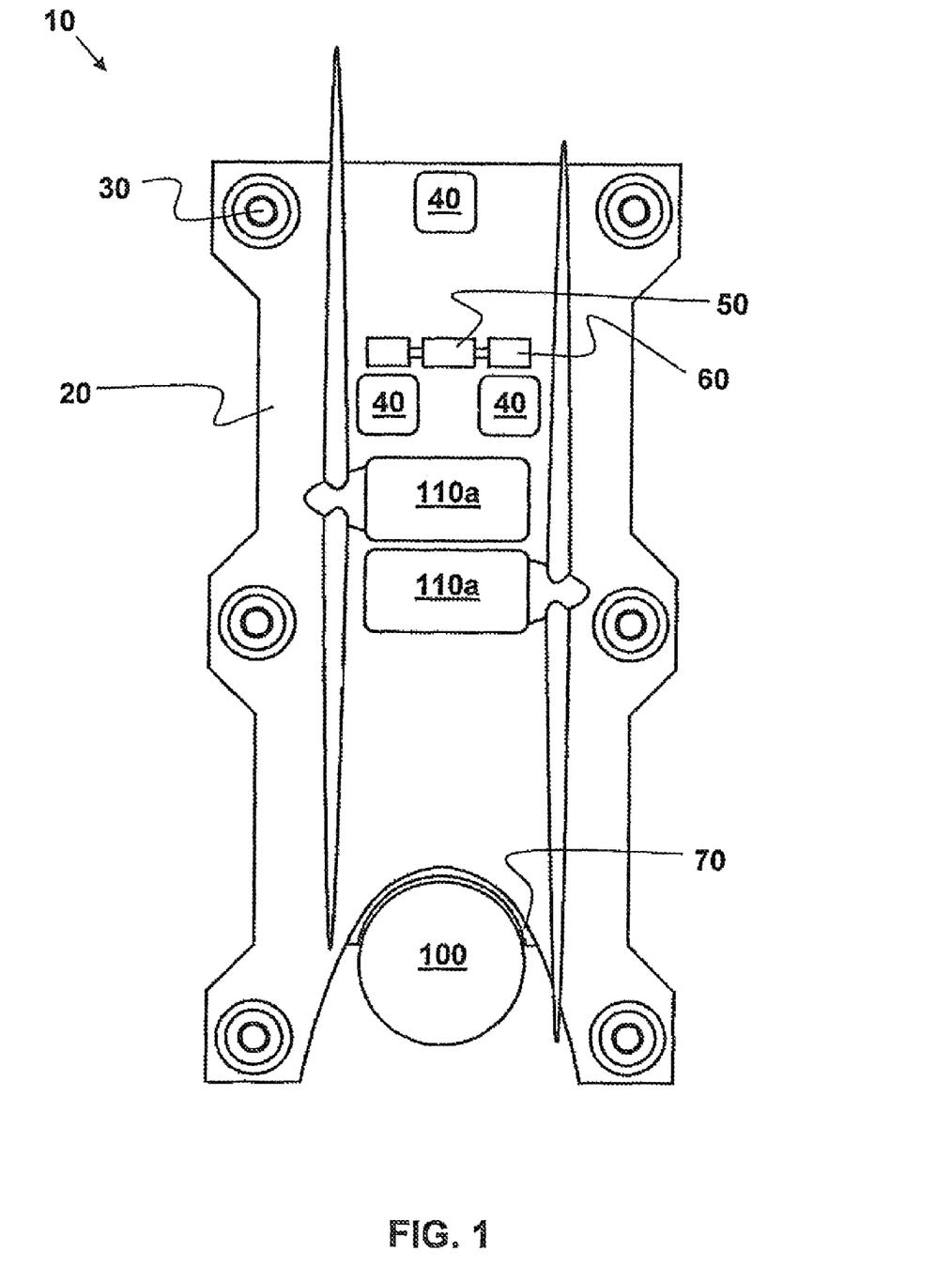
FIG. 1 shows a schematic top view of a particularly preferred exemplary embodiment of a watercraft for carrying out the inventive method.
Figure 2:
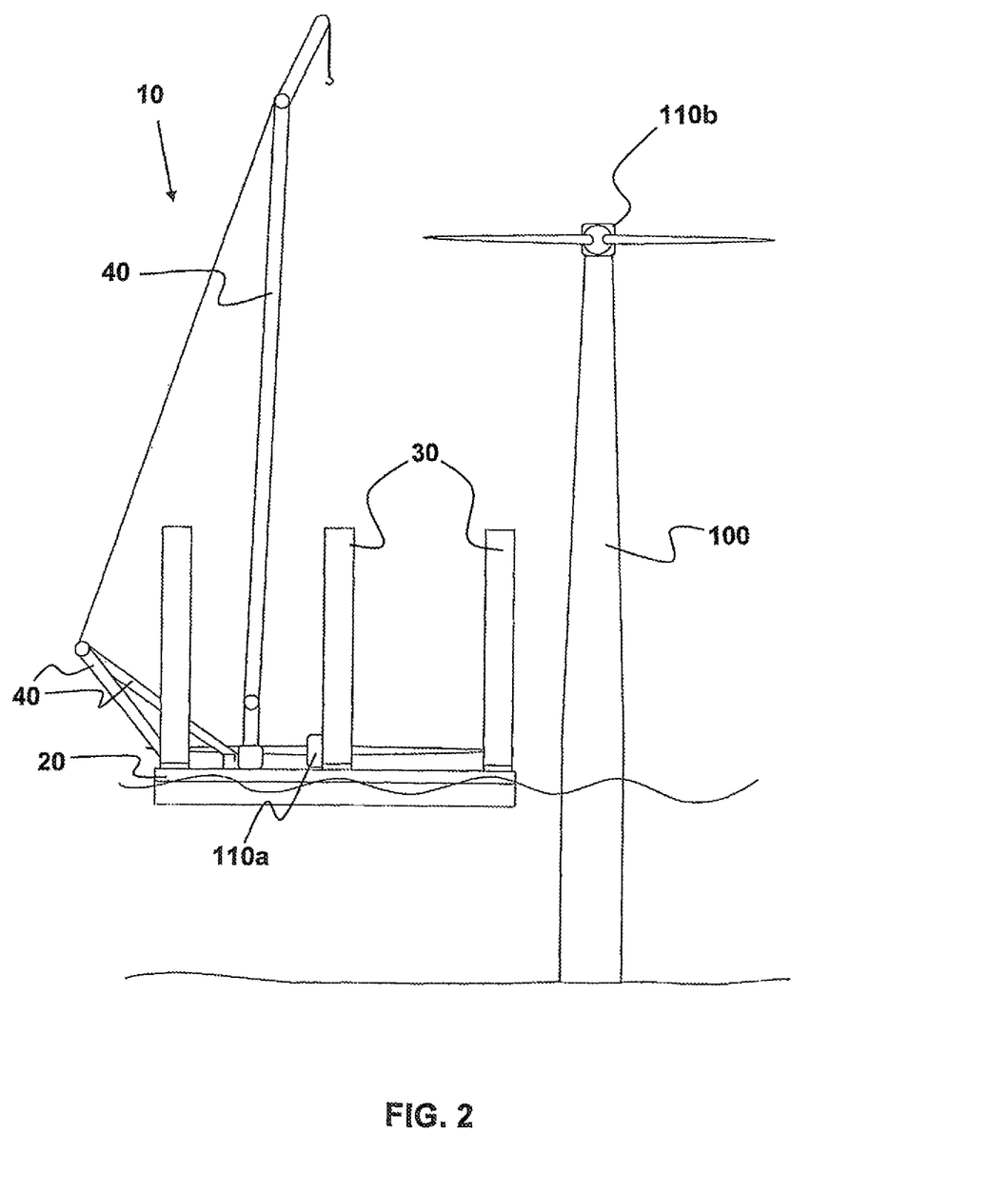
FIG. 2 shows a schematic elevation of the watercraft from FIG. 1 while approaching an offshore wind turbine with a unit to be replaced.

FIG. 1 shows a schematic elevation of the watercraft in a top view. For the purpose of greater clarity only those elements have been illustrated here that are directly at the level of the deck. It is thus in particular the crane superstructures that are not shown in this view.

The watercraft 10 has a hull 20 with preferably six support columns 30 that can be lowered and are arranged such that a load distribution of the loads arranged on the hull results that is as even as possible. Of course it is also possible to envisage a higher or lower number of support columns 30, the minimum in terms of support columns being limited to three support columns 30.

The hull 20 has on its one end face an essentially U-shaped docking zone 70 that is arranged centrally in the longitudinal direction and that can also have an approximate V shape that is matched to the diameter of the tower of an offshore wind turbine 100 at sea level. Here the docking zone is thus arranged such that the center point of the cross-section of the offshore wind turbine 100, in the state docked to the watercraft 10, is situated essentially on the imaginary extension of the longitudinal axis of the watercraft 10. To avoid any damage to the watercraft 10 or the tower 100, the docking zone 70 can also have suitable means according to the type of a buffer zone.

Arranged opposite the docking zone 70 a crane 40 is situated that can be swiveled along the longitudinal axis of the watercraft 10 and that is drawn in FIG. 1 only with its elements 40 close to the hull. The crane 40 preferably has two cable systems that are wound on two individual drums 60 and that are driven via a shared drive 50. Both cable systems are needed for lifting and lowering loads without rotating which is ensured by the fact that the cable systems are fastened to the load at two points that are spaced apart from each other along an axis, preferably the longitudinal axis of a unit.

If a new offshore wind turbine 100 is erected, the load consists of an essentially functional unit 110a, 110b with a nacelle and a rotor that consists of one or two rotor blades whose center of gravitation is in any case situated approximately on the longitudinal axis of the watercraft 10. Here, several functional units can also be arranged in several stories one above the other on the watercraft 10, so that several offshore wind turbines can be provided with a unit that is ready to function.

Figure 6:
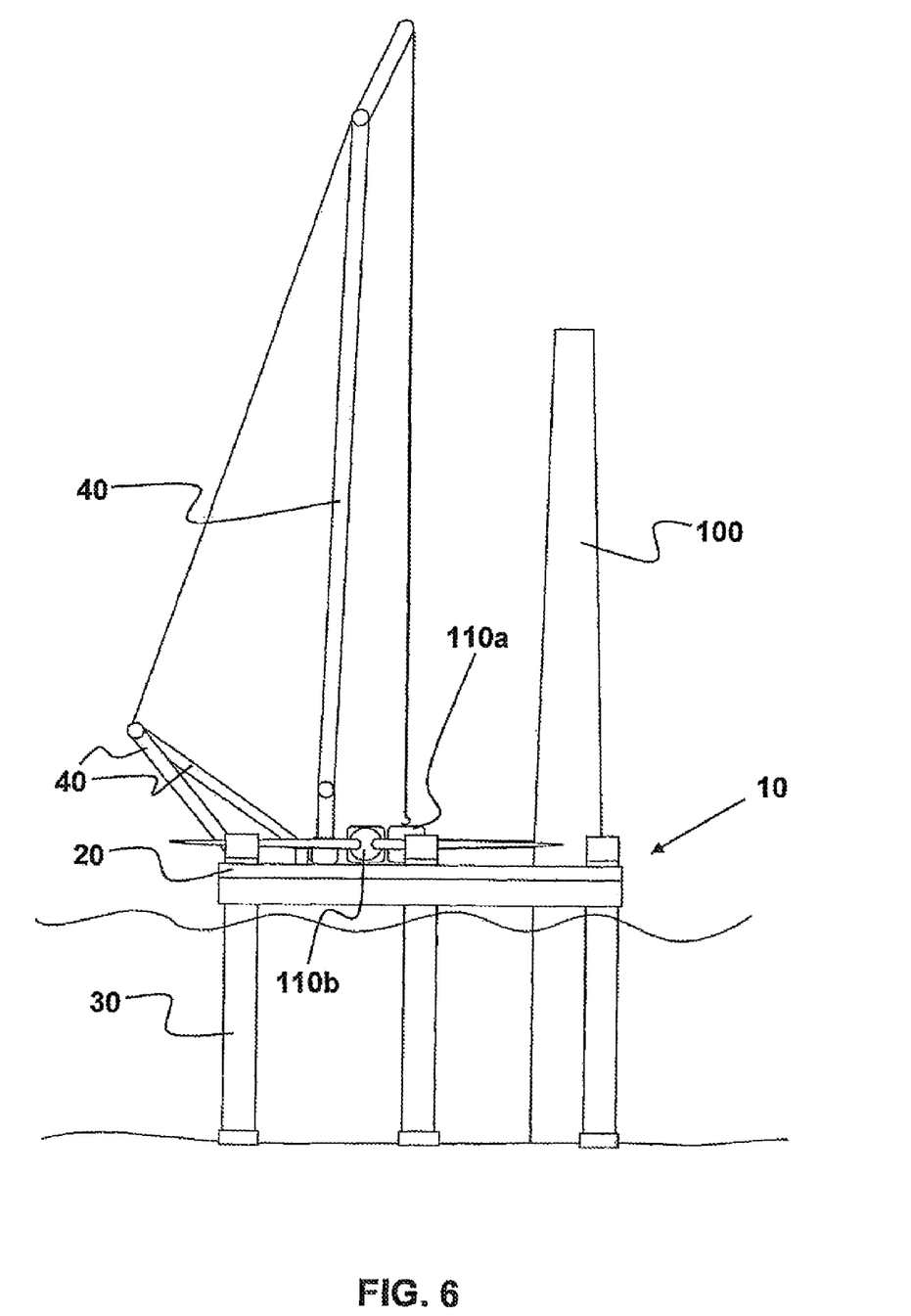
FIG. 6 shows a schematic elevation of the watercraft while receiving the functional unit from the watercraft.
Figure 7:
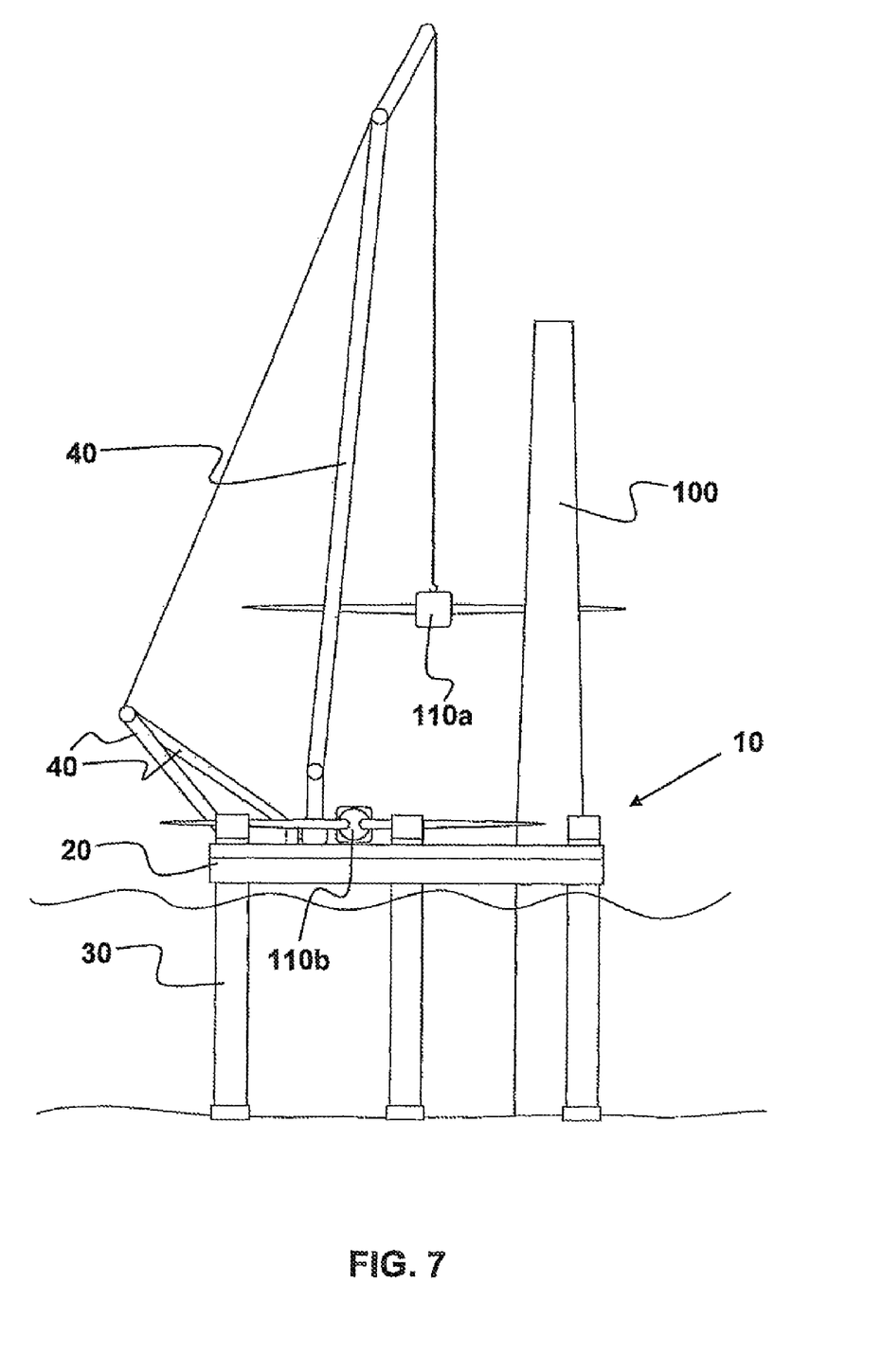
FIG. 7 shows a schematic elevation of the watercraft while lifting and transferring the functional unit from the watercraft to the tower of the wind turbine.
Figure 8:
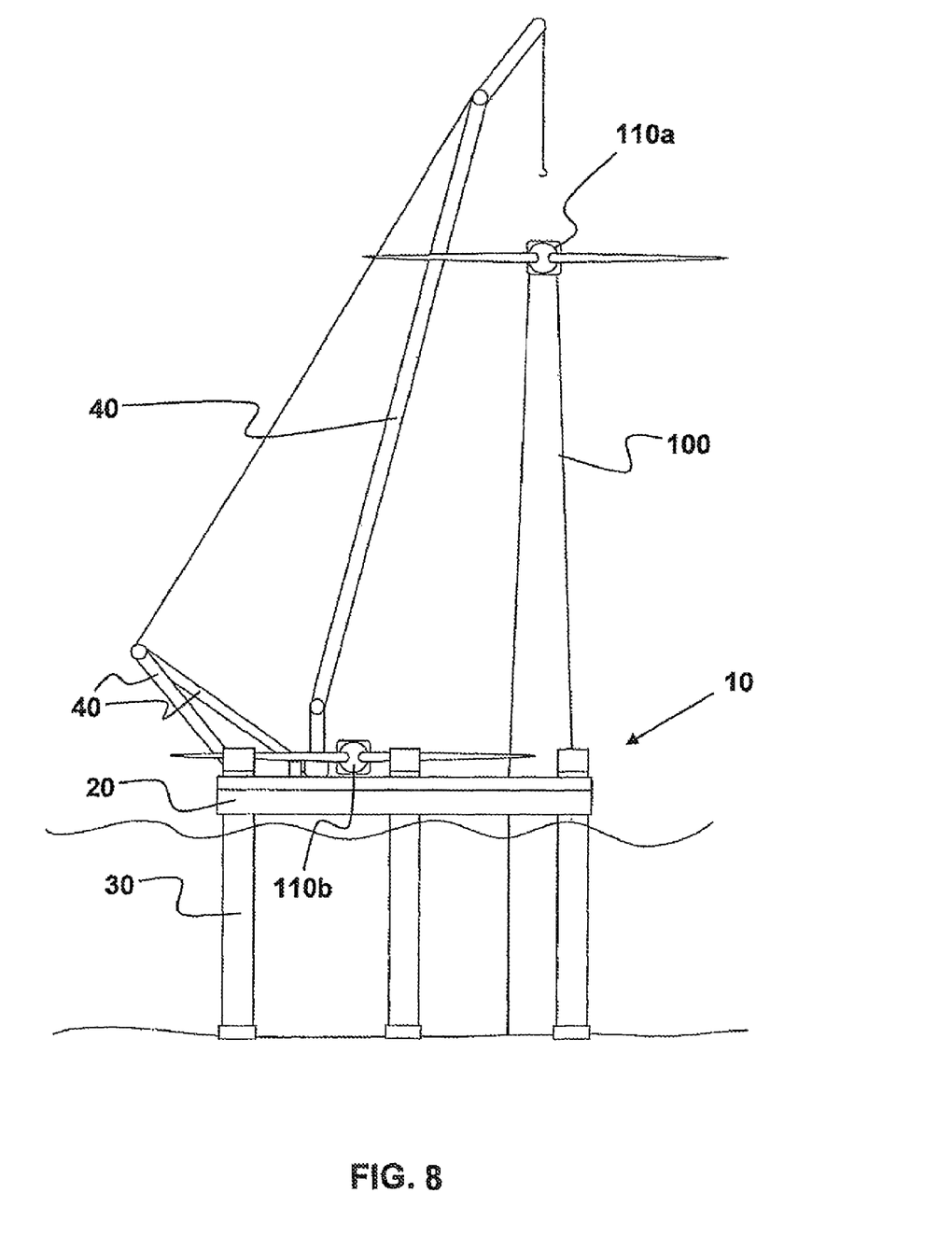
FIG. 8 shows a schematic elevation of the watercraft after setting down the functional unit on the tower of the wind turbine.

If, however, the watercraft 10 is used for repairing offshore wind turbines 100, then only part of the load capacity of the watercraft 10 is utilized since at first the defective unit 110b has to be removed from the defective offshore wind turbine 100 and set down at a free location on the hull 20 of the watercraft 10. This location is kept free in such a way that the defective unit 110b comes to rest with its center of gravitation essentially on the longitudinal axis of the watercraft 10. This can for example be the unit 110b shown in FIG. 6. Then the functional unit 110a is attached, that is, lifted by the crane 40 and placed on the tower of the offshore wind turbine 100 and fastened thereto.

That the centers of gravitation of the units 110a, 110b and the vertical axis of the tower of the offshore wind turbine coincide with the longitudinal axis of the watercraft 10 is not only necessary to ensure the stability of the watercraft, but also that the pivot axis of the crane 40 can be limited only to this direction.

Figure 3:
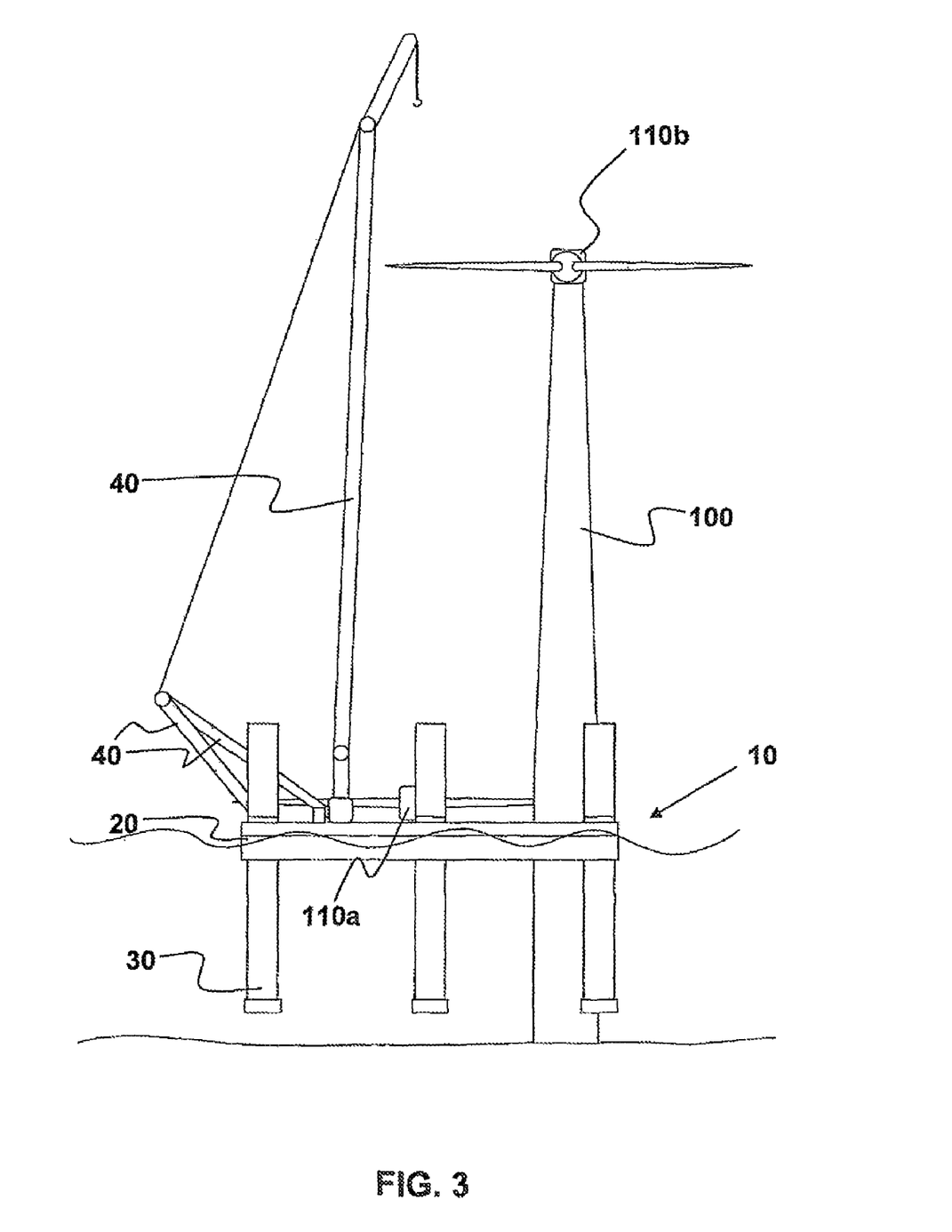
FIG. 3 shows a schematic elevation of the watercraft in a second phase of the approach with support columns that are being lowered.
Figure 4:
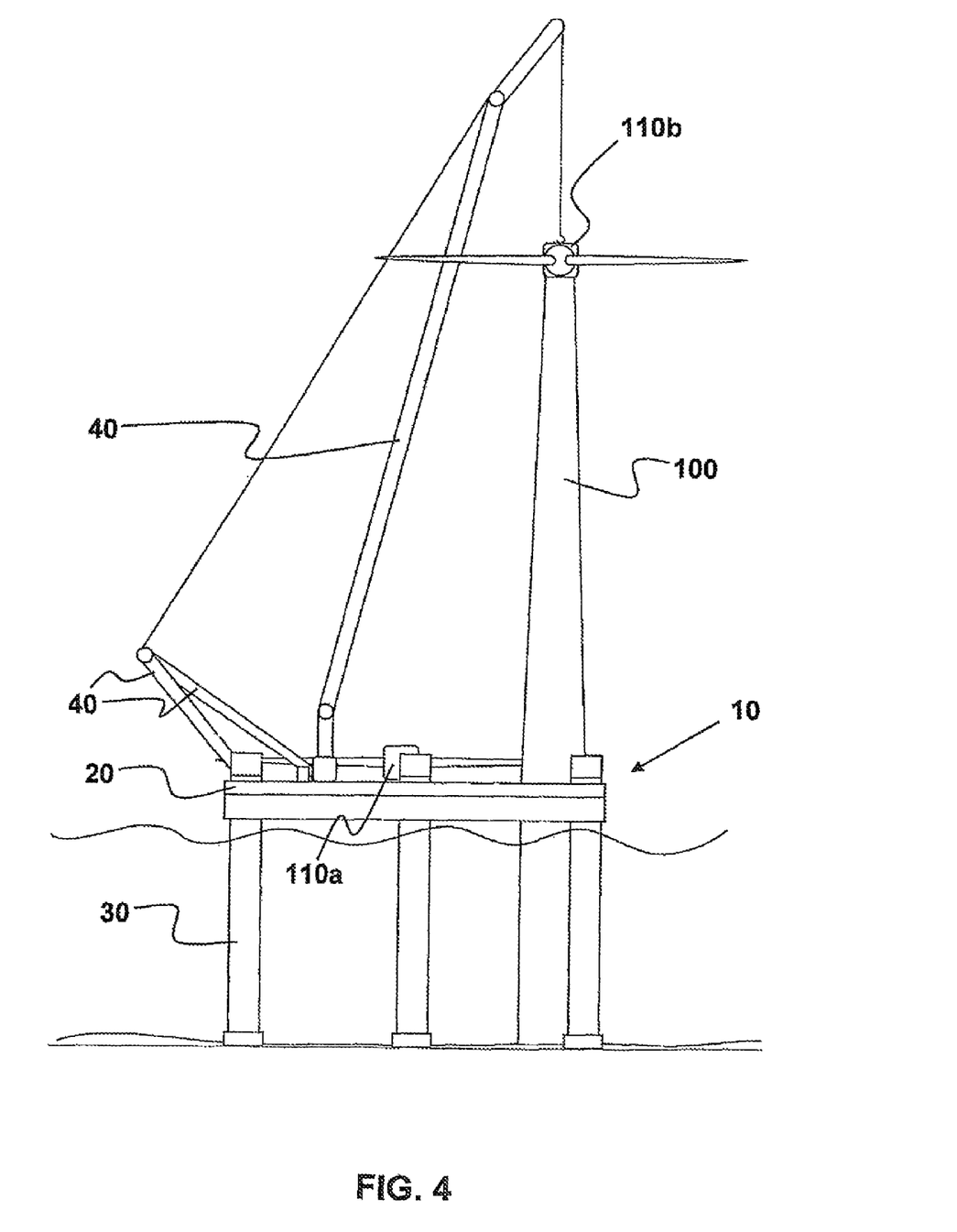
FIG. 4 shows a schematic elevation of the watercraft while receiving the unit to be replaced.

The necessity of these preconditions is made clear in the schematic elevation of FIGS. 2 to 8. The inventive watercraft 10 at first approaches, in a floating manner, the location of an offshore wind turbine 100 whose unit 110b is to be replaced. The support columns 30 that can be lowered are extended and the watercraft 10 is fixed on the sea bed, the hull 20 coming to rest above the waterline (FIGS. 3, 4).

Preferably the watercraft 10 has its own drive for locomotion or for correcting the course while approaching the offshore wind turbine 100. However, such a drive is not mandatory—the watercraft can also be a barge that is maneuvered into the designated position by one or more tugs.

The crane 40 has several elements that are connected to each other in an articulated manner that provide on the one hand the necessary carrying capacity of the crane, but on the other hand also that the crane 40 can be folded downward to a vertical minimum dimension. In this way the crane 40 can be folded into a horizontal position preferably during the passage from the port to the location of the offshore wind turbine, in which position it rests above the unit 110a, so that for example bridges can be passed without hindrance. Here the lowermost hinge of the crane 40 is situated above the level of a functional unit 110a arranged on the hull 20, so that the elements of the crane 40 arranged above this hinge can assume the horizontal position above the units 110a, 110b. Advantageously, special supporting elements will be provided that permit the crane to be placed in a horizontal position without damaging the unit 110a.

For removing a unit 110b to be replaced and for placing a functional unit 110a on the offshore wind turbine 100, the crane 40 only executes a swiveling movement between a position, in the example on the left, above a unit 110a arranged on the hull 20, and a right position arranged above the tower cross-section (FIGS. 5-8).

Figure 5:
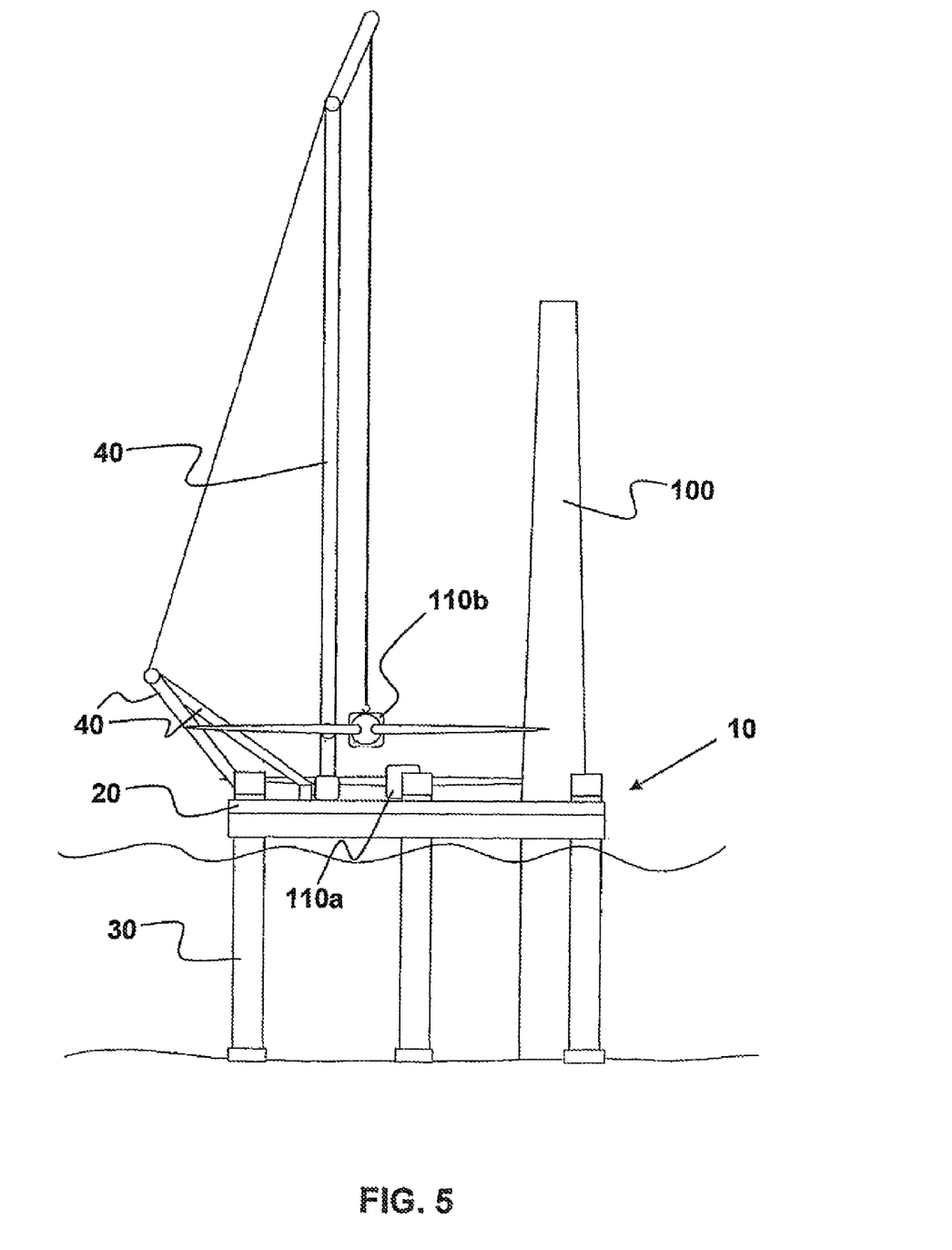
FIG. 5 shows a schematic elevation of the watercraft while setting down the unit to be replaced on the watercraft.

In the process, at first the unit 110b to be replaced, after the rotor has been braked and fixed in the horizontal position, is released from the tower 100 of the offshore wind turbine, removed, and placed on the watercraft 10 (FIGS. 4 and 5). Then the functional unit 110a whose rotor likewise is braked horizontally, is lifted from the watercraft 20 and placed on the tower 100 of the offshore wind turbine and fastened, so that the turbine can be put into operation again immediately after the replacement of the units 110a, 100b, so that longer down times than previously can be avoided.

Using the inventive method and the inventive watercraft 10 for carrying out the method, it is thus possible to erect or repair several offshore wind turbines 100 in an offshore area within a short period of time. The unit 110a consisting of the nacelle and the rotor is preferably assembled onshore or at a comparable site, for example a platform (also in an offshore area) and transferred to the site where the unit 110a is to be placed on a newly erected tower 100 of an offshore wind turbine 100 or a defective unit 110b is to be replaced.

Here the orientation of the blade of the single-blade rotor or the blades of the two-blade rotor is selected such that the predetermined route between the place of assembly and the place where the turbine is to be erected in the offshore area can be passed without hindrance. This means that for the passage of waterways (such as canals), locks or passages under bridges the position of the rotor blade or of the rotor blades and of the crane elements is in each case adjusted such that the extent of the rotor blade or of the rotor blades is smaller than the smallest clear span of the waterway or lock or the clear height of the bridge that is required for the passage. For this reason the rotor blades of a single-blade or a two-blade rotor will preferably be oriented in the longitudinal direction of the watercraft 10.

For improved loading of the watercraft with one or more functional units 110a, 110b, the watercraft preferably has rails running in its longitudinal direction for moving the units 110a, 110b that rest on a carriage, on and off. On land or on a platform in the offshore area, a docking zone is therefore provided for the watercraft 20 that is of complementary shape to the U-shaped docking zone 70 of the watercraft 20 and likewise exhibits a rail system that is connected to the rails of the watercraft 20 when the watercraft 20 has docked. Preferably the support columns of the watercraft 20 will be extended when the watercraft 20 is being loaded or unloaded, and fix the watercraft 20 at the level opposite the level of the land-side docking zone or the docking zone of the platform.

The invention claimed is:

1. A method for installing or replacing a unit on a tower of an offshore wind turbine comprising:
    pre-assembling a unit ashore or on a platform such that the unit includes a rotor consisting of a hub and one or two rotor blades, and a nacelle receiving a gearbox and a generator;
    testing the unit either ashore or on the platform to verify the unit constitutes a fully functional unit;
    placing the functional unit on a watercraft in such a manner that a center of gravitation of the functional unit lies in a region of a longitudinal axis of the watercraft and each of the one or two rotor blades extends in a longitudinal direction of the watercraft;
    transporting the functional unit to a site of the offshore wind turbine;
    lifting the functional unit from the watercraft using a crane aboard the watercraft;
    placing the functional unit on the tower of the offshore wind turbine; and
    fastening the functional unit on the tower of the offshore wind turbine.

2. The method of claim 1, further comprising:
    detaching a unit being replaced from the tower of the offshore wind turbine prior to placing the functional unit on the tower.

3. The method of claim 2, further comprising:
    removing the unit being replaced from the tower using the crane aboard the watercraft.

4. The method of claim 2, further comprising: placing the unit being replaced on the watercraft.

5. The method of claim 4, further comprising: transferring the unit being replaced ashore by means of the watercraft.

6. The method of claim 1, further comprising: maintaining each of one or two rotor blades in the longitudinal direction of the watercraft while transporting the functional unit to the site.

7. A watercraft for installing a functional wind turbine unit, including a rotor, a hub, at least one rotor blade, and a nacelle receiving a gearbox and a generator, on a tower of an offshore wind turbine comprising:
    support columns that can be lowered;
    a U-shaped docking zone arranged centrally in a longitudinal direction of the watercraft, said U-shaped docking zone being matched to a diameter of the tower of the offshore wind turbine at sea level; and
    a crane, mounted for swiveling movement about the longitudinal axis of the watercraft, for lifting the unit and placing the unit on the tower of the wind turbine, wherein the crane can be folded into a horizontal position resting above the wind turbine unit on the watercraft.

8. The watercraft according to claim 7, further comprising: multiple receptacles for multiple wind turbine units.

9. A watercraft for installing a functional wind turbine unit, including a rotor, a hub, at least one rotor blade, and a nacelle receiving a gearbox and a generator, on a tower of an offshore wind turbine comprising:
    support columns that can be lowered;
    a U-shaped docking zone arranged centrally in a longitudinal direction of the watercraft, said U-shaped docking zone being matched to a diameter of the tower of the offshore wind turbine at sea level;
    a crane, mounted for swiveling movement about the longitudinal axis of the watercraft, for lifting the unit and placing the unit on the tower of the wind turbine;
    a carriage provided on the watercraft upon which the wind turbine unit rests; and
    rails running in the longitudinal direction of the watercraft for moving the wind turbine unit on and off the carriage.

10. A method for installing or replacing a unit on a tower of an offshore wind turbine comprising:
    pre-assembling a functional unit ashore or on a platform such that the functional unit includes a rotor having a hub and only one or two rotor blades, and a nacelle receiving a gearbox and a generator;

placing the functional unit on a watercraft in such a manner that a center of gravitation of the functional unit lies in a region of a longitudinal axis of the watercraft and each of the only one or two rotor blades extends in a longitudinal direction of the watercraft;

transporting the functional unit to a site of the offshore wind turbine while maintaining each of one or two rotor blades in the longitudinal direction of the watercraft;

lifting the functional unit from the watercraft using a crane aboard the watercraft;

placing the functional unit on the tower of the offshore wind turbine; and fastening the functional unit on the tower of the offshore wind turbine.

11. The method of claim 10, further comprising:
detaching a unit being replaced from the tower of the offshore wind turbine prior to placing the functional unit on the tower.

12. The method of claim 11, further comprising:
removing the unit being replaced from the tower using the crane aboard the watercraft.

13. The method of claim 11, further comprising: placing the unit being replaced on the watercraft.

14. The method of claim 13, further comprising: transferring the unit being replaced ashore by means of the watercraft.

15. The method of claim 10, further comprising: testing the functional unit either ashore or on the platform to verify the functional unit is fully operational prior to placing the functional unit on the watercraft.

* * * * *